United States Patent [19]
Sears et al.

[11] 3,826,276
[45] July 30, 1974

[54] LEVEL SENSING APPARATUS
[75] Inventors: James H. Sears, Anderson; Bernard H. Jones, Pendleton, both of S.C.
[73] Assignee: Owens-Corning Fiberglass Corporation, Toledo, Ohio
[22] Filed: Dec. 22, 1971
[21] Appl. No.: 210,872

[52] U.S. Cl..................... 137/389, 137/403, 137/486
[51] Int. Cl............................................ F16k 31/02
[58] Field of Search......... 137/2, 386, 82, 389, 403, 137/412, 486, 487.5

[56] References Cited
UNITED STATES PATENTS

| | | | |
|---|---|---|---|
| 2,577,564 | 12/1951 | Borden, Sr. | 137/486 |
| 2,695,030 | 11/1954 | Rice | 137/412 |
| 2,719,080 | 9/1955 | Schmidt et al. | 137/2 X |
| 2,988,099 | 6/1961 | Langhans | 137/82 |
| 3,012,373 | 12/1961 | Willis | 136/2 X |
| 3,051,192 | 8/1962 | Fagot et al. | 137/403 X |
| 3,181,556 | 5/1965 | Baker | 137/389 |
| 3,285,608 | 11/1966 | Lyman | 137/82 X |
| 3,667,500 | 6/1972 | Stone | 137/386 |

Primary Examiner—William R. Cline
Assistant Examiner—David R. Matthews
Attorney, Agent, or Firm—Staelin & Overman

[57] ABSTRACT

Apparatus for controlling the level of a body of flowable material including a passageway for flow of gas to the level of the body, means for supplying a gas to the passageway, means for sensing the flow of gas in the passageway as an indication of the level and means effective in response to the sensed flow of gas controlling supply of material to the body to maintain a selected level.

2 Claims, 19 Drawing Figures

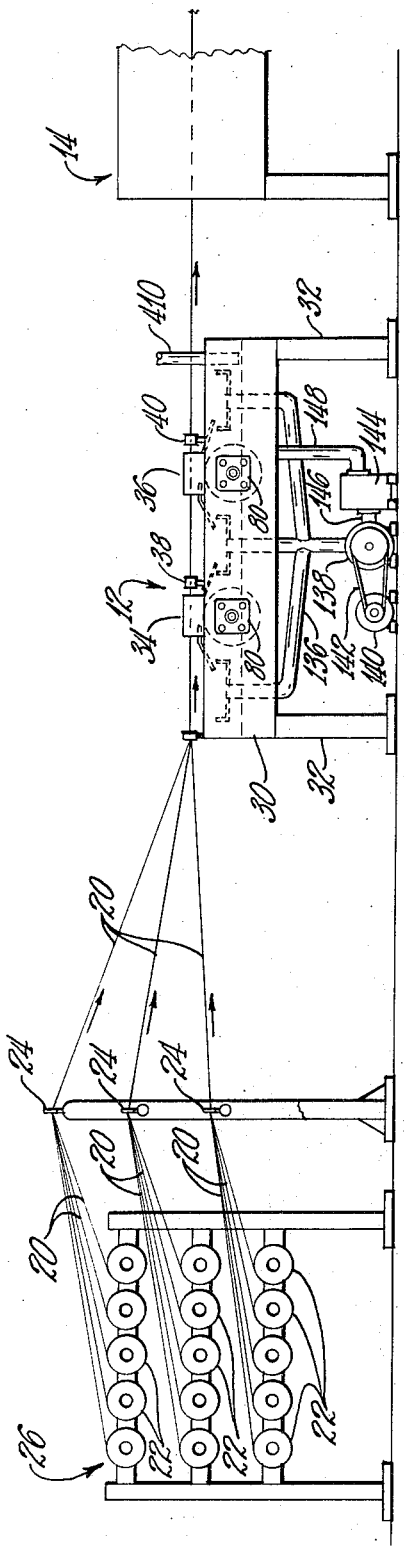
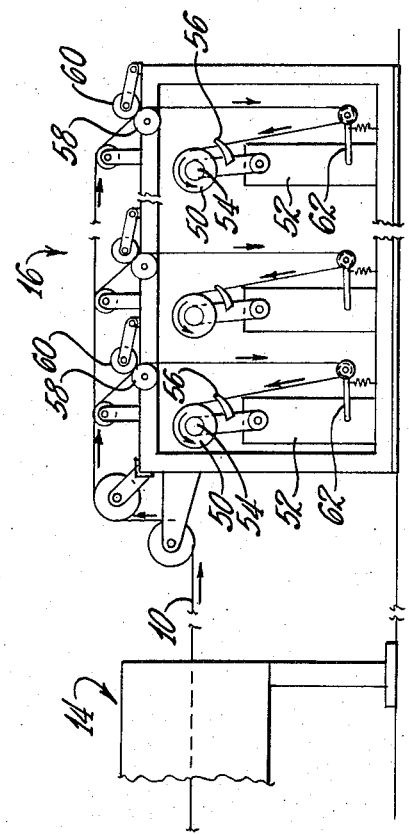

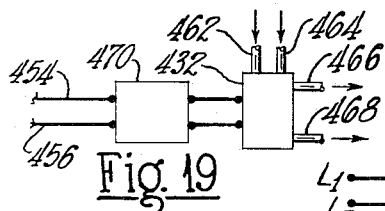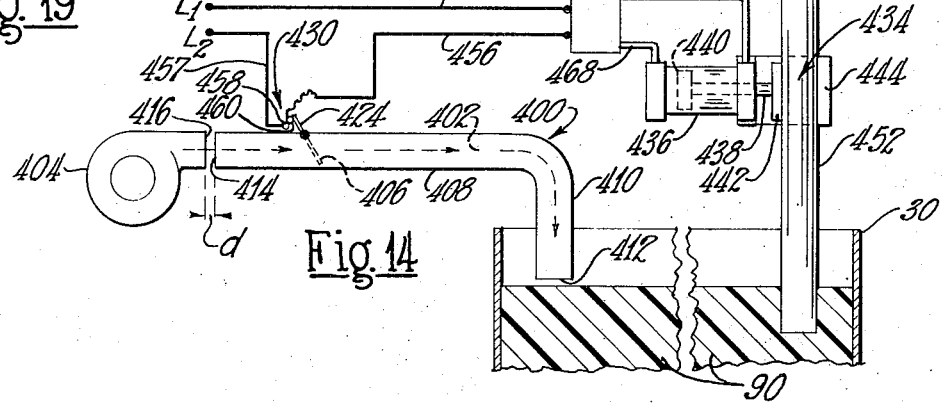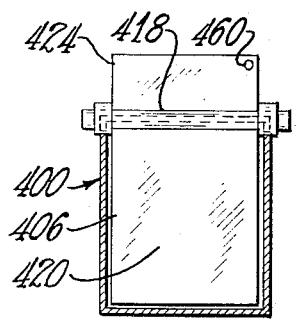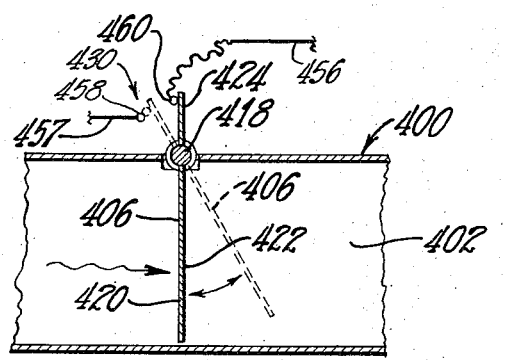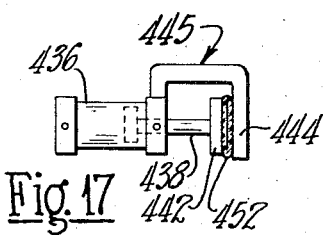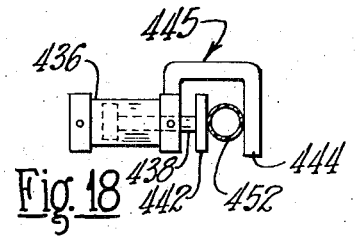

LEVEL SENSING APPARATUS

BACKGROUND OF THE INVENTION

For various purposes it has been common practice to treat, e.g., coat and impregnate, linear elements with a variety of substances. In carrying out these practices liquid was usually applied either by turning linear elements such as glass strands to pass through a bath of liquid or pumping liquid directly to traveling linear elements.

These prior practices have severe limitations.

Linear elements must be turned on guides or rollers to travel through a bath of liquid. Hence, there are several contact zones between the linear elements and the turning surfaces. This contact is damaging to linear elements such as bundles of glass filaments. Some of the glass filaments tend to break during contact with turning surfaces. An inferior product is the result.

Pumping coating liquid directly to linear elements has tended to degrade the liquid. Pumps shear work liquids and tend to increase the temperature of the liquids. An inferior product ensues.

SUMMARY OF THE INVENTION

An object of the invention is improved apparatus for applying liquid to linear elements such as glass strands and yarns.

Another object of the invention is improved apparatus for applying controlled viscosity liquid coating to linear elements such as glass strands and yarns.

Yet another object of the invention is apparatus for uniformly applying liquid to a plurality of linear elements.

Still another object of the invention is improved apparatus for coating linear elements such as glass strands and yarns.

Still another object of the invention is improved level sensing apparatus.

And yet another object of the invention is improved apparatus for controlling the level of flowable material.

These and other objects are attained by apparatus operating to supply liquid to linear elements along their paths of travel. In a more specific sense apparatus according to the principles of the invention provides a passageway having a longitudinal transverse dimension and pairs of opposing apertures distributed along the transverse length of the passageway. Each pair of apertures is aligned for passage of a linear element. The passageway has an elongated inlet extending along the transverse length of the passageway. Moreover, the apparatus includes means for feeding liquid to the passageway at a uniform rate over the entire length of the inlet.

In another sense the objects are attained by apparatus providing an enclosed space or passageway for containing liquid where the passageway has a pair of opposing apertures aligned for passage of a linear element therethrough and has an inlet for supply of liquid. A moving surface immediately adjacent the inlet carries liquid to the inlet; means for transferring liquid from the surface to the passageway insures a supply of liquid to the linear element during its travel through the apertures (and hence the passageway).

The invention also embraces level sensing apparatus that includes a passageway for flowing gas to the level of a body of flowable material to be sensed, means for supplying gas to the passageway and means sensing flow of the gas in the passageway; the sensing means being effective to sense the free flow of gas through the passageway when the outlet of the passageway is spaced from the level and to sense the reduced flow of gas upon reduced flow in the passageway upon the level being in proximity with the outlet of the passageway.

The invention further embraces the use of means effective in response to the sensed free flow of gas to supply flowable material to the body and effective in response to the sensed reduced flow to stop supply.

Other objects and advantages will become more apparent as the invention is more fully explained with reference made to the accompanying drawings.

DESCRIPTION OF THE DRAWINGS

FIG. 1 is a side elevation view of production line apparatus applying a coating liquid to glass yarns according to the principles of the invention.

FIG. 2 is a side elevation view of an extension of the production line apparatus shown in FIG. 1.

FIG. 14 is a simplified side elevation view of level sensing and control apparatus according to the principles of the invention.

FIG. 15 is an enlarged view, partially in section, of the flow sensing apparatus shown in FIG. 14.

FIG. 16 is an enlarged side elevation view in section of the flow sensing apparatus of FIG. 15.

FIG. 17 is an enlarged view of the pinch valve shown in FIG. 14 illustrated in the opening position.

FIG. 18 is an enlarged view of the pinch valve shown in FIG. 17 in the closed position.

FIG. 19 is a showing of a time delay relay used with the apparatus shown in FIG. 14.

DESCRIPTION OF THE PREFERRED EMBODIMENTS

Figure 3:
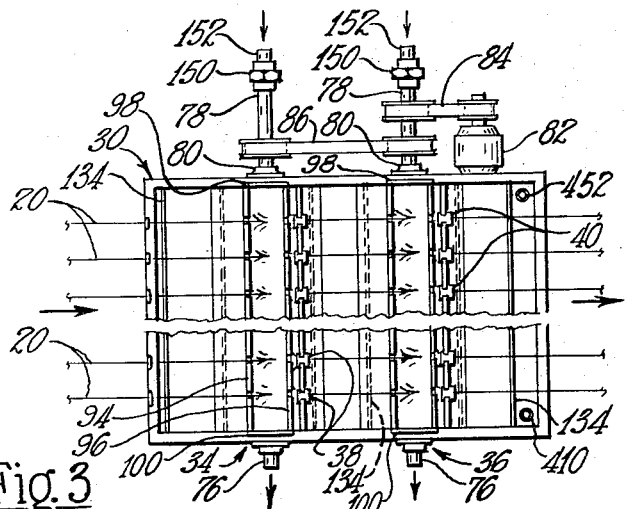
FIG. 3 is a somewhat enlarged plan view of the coating station shown in FIG. 1.
Figure 4:
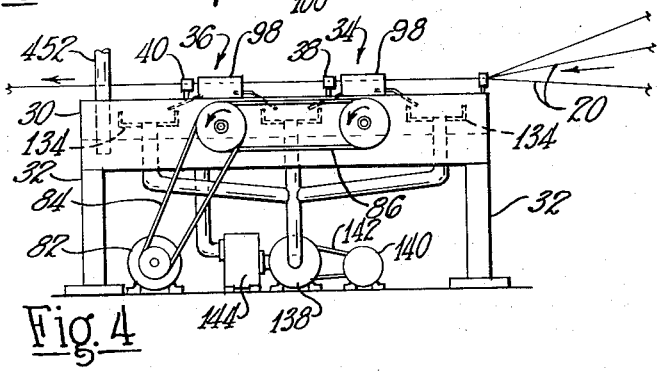
FIG. 4 is a side elevation of the coating station shown in FIGS. 1 and 3.

While apparatus of the invention normally treat multifilament linear elements, including bundles of continuous filaments such as continuous filament glass strand, they can also treat other linear elements such as monofilaments or linear elements including discontinuous filaments. Further, the invention may treat twisted linear elements such as continuous filaments glass yarn, cord, etc. Moreover, one may use apparatus of the invention to treat linear elements made of a variety of materials such as nylon, polyester and the like. The use of glass strand to explain the invention is only an example.

FIGS. 1 and 2 illustrate apparatus according to the principles of the invention that produces vinyl coated glass strands 10. The apparatus embodies a horizontal coating process and includes a coating station 12, an oven 14 and winding apparatus 16.

Individual uncoated glass strands 20 travel from separate wound serving packages 22 to the coating station 12 through guides 24. A creel 26 holds the serving packages 20.

The strands 20 travel in a common horizontal plane across the apparatus of the coating station 12.

In the embodiment shown in FIGS. 1 and 2 the coating station 12 includes a tank 30 holding a vinyl plastisol coating liquid and supported on legs 32, applicators 34 and 36 and associated coating or wiping dies 38 and 40 respectfully. The applicators and dies are shown held on the tank 30. In the embodiment shown the applicator 34 and the dies 38 and identical to the applicator 36 and the dies 40. But it is possible to use dies having different size openings. For example the openings through dies 40 might be larger than the openings through dies 38.

The apparatus supplies coating liquid to the tank 30. Level control apparatus keeps the liquid at a selected or predetermined level in the tank 30.

At each of the applicators the advancing strands 20 travel as a horizontal sheet of parallel strands through a body of coating liquid contained in an elongated confined region or passageway. From each of the coating applicators 34 and 36 the strands 20 advance through the associated coating dies 38 and 40 respectfully.

The coating liquid can be any useful coating material. In practice the apparatus is normally used with coating liquids that are normally fairly viscous. Examples of useful coating liquids are dispersions, such as latices and plastisols, and polymeric material in solvents. It is believed that at times it would be useful to use other treating liquids such as conventional liquid textile sizings or liquid finishes.

In practice the amount of coating liquid applied to the strands 20 at the applicators 34 and 36 is normally greater than required to form the coated strands 10. So the strands 20 traveling to the dies 38 and 40 usually have an excess or superfluous amount of coating liquid on them.

The coating or wiping dies 38 and 40 remove unwanted or superflous coating liquid from the advancing strands 20. Hence, the dies 38 and 40 control the amount of vinyl coating on the coated strands 10.

The strands 20, with a predetermined amount of vinyl plastisol coating liquid on them, are shown traveling from the coating station 12 through a heating means in the form of the oven 14. While the oven 14 can heat treat coated linear elements variously depending on the type of coating material and the intended use of the coated elements, the oven 14 is normally a thermal oven that dries or cures the coating liquid. As shown the oven 14 fuses the vinyl plastisol on the traveling strands 20. In certain situations, treatment of the coated elements or strands by a heating means may be unnecessary or even undesirable.

The winding apparatus 16 collects the coated strands 10 into individual wound packages 50. In the embodiment shown the winding apparatus 16 is commercially available apparatus including a variable speed drive 52 for rotating individual spools 54, a reciprocating strand traverse guide 56 for each of the spools 54, a pair of constant speed cooperating feeding rolls 58 and 60 for each of the spools 54 and a pivotally mounted control arm 62 for each of the variable speed drives 52. As each of the spools 54 advances a coated glass strand 10, variations in strand speed raises or lowers the associated control arm 62. The movement of the arm 62 controls the angular speed of the spool through the associated variable speed drive 52 to maintain a substantially constant linear strand collection speed.

FIGS. 3 through 6 more clearly show the apparatus of the coating station 12.

As illustrated the apparatus of the coating station 12 surrounds the strands 20 with liquid as the strands travel through a confined spaced along an essentially straight horizontal path. The station 12 as shown provides spaced apart surfaces forming a passageway for containing liquid where the passageway has a longitudinal transverse dimension. The passageway has opposing pairs of apertures distributed along the transverse length of the passageway each for passage of a glass strand 20. The passageway further includes an elongated inlet for supply of liquid disposed with its length along the transverse length of the passageway. The apparatus includes means for feeding liquid at a uniform rate over the entire length of the passageway (inlet).

In one sense the apparatus of the coating station 12 uses a moving surface supply device to move a band of coating liquid at a uniform rate through an elongated opening into the confined zone.

In FIGS. 1 and 2 the applicators 34 and 36 are longitudinal spaced apart assemblies each disposed across the width of the tank 30. Each of the applicators 34 and 36 includes a hollow cylindrical roll 70 for transporting coating liquid, wall portions forming a confined region or passageway 72 and means for transferring coating liquid from the circumferential surface of the hollow cylindrical rolls 70 into the passageway 72.

Referring to FIGS. 5, 6, 7 and 8, one can see that each of the cylindrical rolls 70 includes a hollow central cylindrical portion 74 and tubular end shafts 76 and 78 each communicating with the interior of the cylindrical portion 74. The shafts 76 and 78 extend coaxially from the ends of the hollow cylindrical portions 74. And the cylindrical central portion 74 of each of the rolls 70 extends across the width of the tank 30.

The cylindrical rolls 70 are rotatably mounted on the tank 30. As shown ball bearing pillow blocks 80 on the side walls of the tank 30 carry the shafts 76 and 78 to hold the cylindrical rolls 70 for rotation.

In operation the cylindrical rolls are driven in rotation. As more clearly shown in FIGS. 3 and 4 the drive includes an electrical motor 82, drive belt 84 and drive belt 86.

Figure 5:
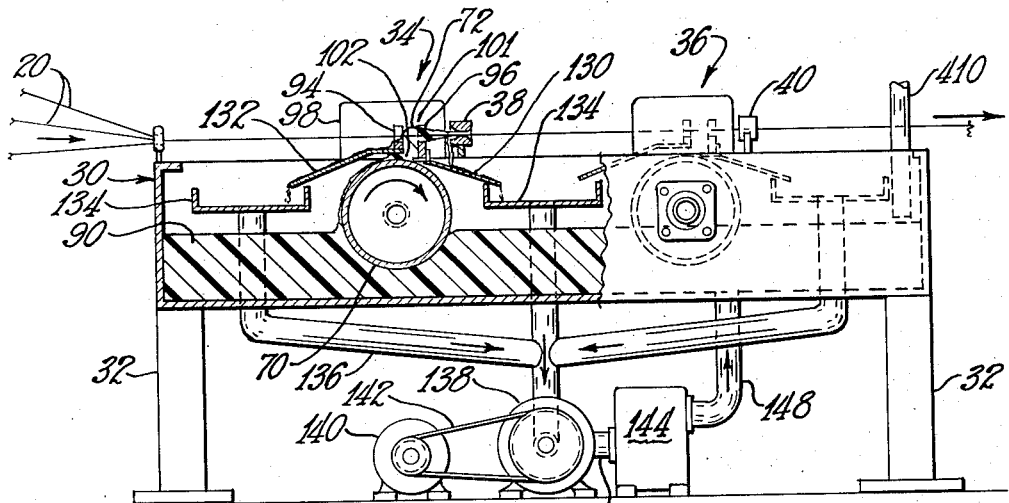
FIG. 5 is an enlarged side elevation view, partly in section of the coating station shown in FIG. 4.
Figure 6:
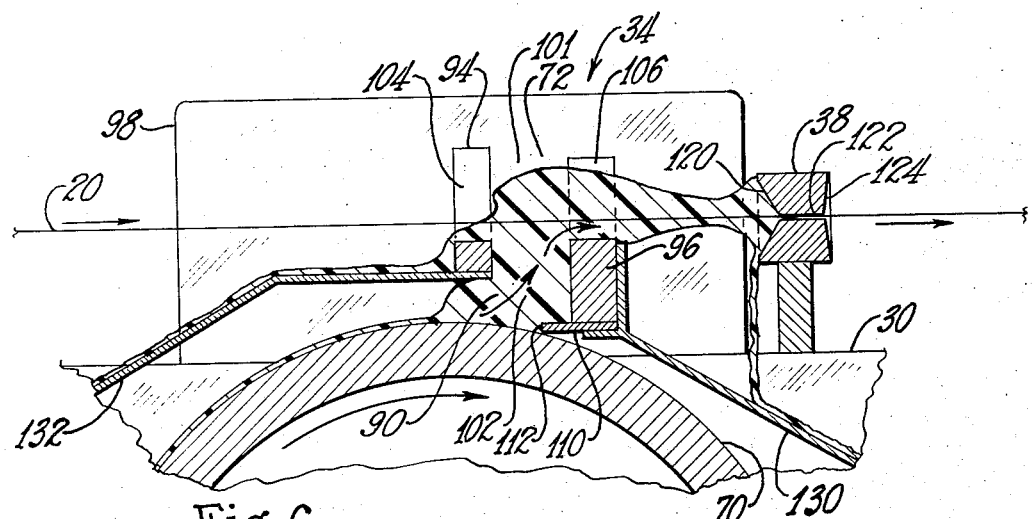
FIG. 6 is a still further enlarged side elevation view of one of the applicators for applying liquid comprising the apparatus of the coating station shown in FIGS. 1 and 3-5.

Referring more specifically to FIGS. 5 and 6, the rolls 70 are shown partially submerged in a body of vinyl plastisol coating liquid 90 held in the tank 30.

The elongated confined space 72 for the coating liquid 90 is immediately above each of the cylindrical rolls 70. Spaced apart horizontal longitudinal sidewall members 94 and 96 and end members 98 and 100 provide vertical walls or surfaces forming the elongated confined space 72. The longitudinal members 94 and 96 extend in a direction generally parallel to the axis of rotation of the cylindrical rolls 70. As shown the space 72 has both an open top 101 and an open bottom or inlet 102. In practice the members 94 and 96 are normally spaced from ½ to 1½ inches apart. In a sense one may consider the members 94, 96, 98 and 100 forming a horizontal elongated trough for containing liquid.

The lengthwise members 94 and 96 have openings in the form of vertical slots 104 and 106 respectively aligned for passage of the strands 20 across the width of the elongated confined space 72. These slots form pairs of opposed openings aligned for passage of the strands 20. In operation the strands 20 travel through the slots 104 and 106 in essentially straight line paths across the confined space 72 to the associated dies as indicated in the Figures.

In the embodiment disclosed in FIGS. 1 and 2, the strands 20 enter the space 72 for application of coating liquid 90 through the slots 104 and leave the space 72 through the slots 106. Hence, it is possible to refer to the member 94 as the applicator entrance wall and the member 96 as the applicator exit wall. Normally, the members 94 and 96 form walls having the same height.

At the bottom of each of the exit walls 96 is a longitudinal stripper or scrapper member 110 in liquid removing relation with the circumferential surface of the cylindrical roll 70. As shown the member 110 is a flat elongated member disposed horizontally lengthwise of the exit wall 96. The leading edge 112 of the member 110 engages the moving circumferential surface of the roll 70.

In operation each of the rotating rolls 70 carries a layer of the coating liquid 90 held in the tank 30 upwardly to the open bottom or inlet 102 of the passageway 72. The stripper 110 engages the liquid on the circumferential surface of the roll 70 to move the liquid into the passageway 72 through the opening 102 to build-up a body or supply of the coating liquid 90 to strands 20 traveling transversely across the space 72 through the slots 104 and 106. This liquid supply arrangement feeds liquid to the passageway 72 at a uniform rate over the entire length of the inlet 102.

As illustrated the strands 20 travel through the mass of coating liquid in the passageway 72. Hence, the coating liquid surrounds the strands 20 during their travel across the space 92.

As the strands 20 advance through the coating liquid 90, the strands 20 entrain or move coating liquid with them. So the traveling strands 20 remove coating liquid from the elongated space 72. Accordingly, the volume of coating liquid 90 moved into the space 72 by the moving circumferential surface of the roll 70 and the stripper 110 must be sufficient to replace coating liquid removed by the strands 20 at the selected production speed of the strands. And the body of coating liquid 90 within the elongated space 72 should be kept above the lower level of the slots 102 and 104; in preferred operation of the apparatus the strands 20 pass through the liquid 90.

Figure 9:
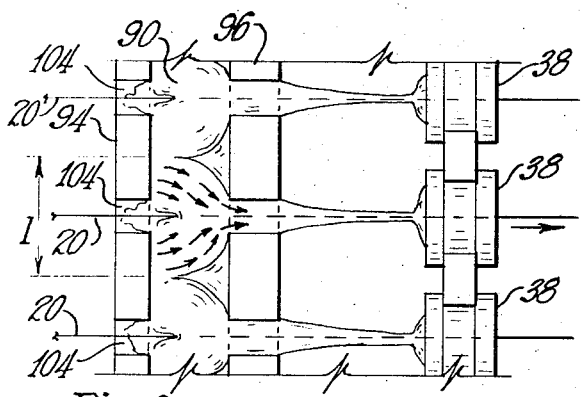
FIG. 9 is an enlarged plan view of a part of the applicator shown in FIGS. 5, 6 and 8. The arrows indicate the movement of the coating liquid in the applicator.
Figure 10:
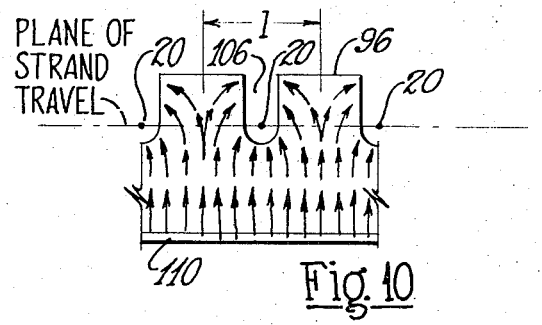
FIG. 10 is a front elevation view of a portion of the applicator portion shown in FIG. 9 further indicating movement of liquid in the applicator.

It can be more easily observed from FIGS. 6, 9 and 10 that an excess amount of coating liquid travels on the strands 20 from the applicators 34, 36 to the dies 38 and 40. In practice the best coating results occur when the entrance region of these dies are full of ("flooded with") coating liquid 90.

As shown the dies 38 and 40 each includes a converging entrance region 120 the central cylindrical passage 122 and a diverging exit 124.

The presence of an excessive amount of coating liquid entrained upon and being carried along with the strands 20 results in most of the liquid coating material being forced backwardly off the strands by the dies 38 and 40.

FIGS. 6, 9 and 10 show the general flow pattern of the coating liquid in the elongated space 72. As one can see from the arrows in these Figures the coating liquid 90 moves uniformly upwardly through the elongated bottom opening 102 of the space 72 towards the plane of strand travel indicated by dashed lines in FIG. 10. The Figures show preferred operation where liquid travels upwardly above and around each of the traveling strands 20 and then moves horizontally in the direction of strand travel. As one can more readily see from FIG. 9 each of the strands 20 is supplied coating liquid from a particular region having a general length "1" lengthwise of the passageway 72. Hence, liquid coating material 90 in the space 72 moves laterally from both sides of the slots 104 to leave with each of the strands 20 through the slots 106. Each of these regions is continuously being supplied with coating liquid 90 along the length of the opening 102; the rate of supply is uniform along the entire length of the opening 102 (and hence uniform over the entire transverse length of the passageway 72).

The lateral dimensions of the slots 104 and 106 should be large enough to permit easy threading of the strands 20 and must be small enough to somewhat limit the quantity of liquid coating material that can flow through the slots. The wall portions between the slots 104 and 106 contain liquid.

The coating station 12 includes a liquid flow system. Excess coating liquid 90 carried from the applicators 34 and 36 at the strand exit side (wall 96) and falling from the dies 38 and 40 is caught by slides 130. Excess coating liquid 90 flowing from the applicators at the strand entrance side (wall 94) is caught by slides 132. The slides 130 and 132 direct coating liquid into recirculating troughs 134. As shown there is a trough 134 at each end of the tank 30 and in the middle region of the tank 30. A branched exit pipe 136 carries coating liquid from the troughs 134 to a pump 138 driven by an electrical motor 140 through a drive belt 142. The pump 138 moves the coating liquid 90 to a filter 144 through a pipe 146. From the filter 144 the coating liquid 90 travels upwardly through a supply pipe 148 into the tank 30 for use again.

In practice the pump 138 is a diaphragm pump to reduce pumping shear action that is detrimental to most coating liquids.

The slides 130 and 132 also function as shields that keep any broken strands from becoming entangled in the rotating rolls 70.

Figure 7:
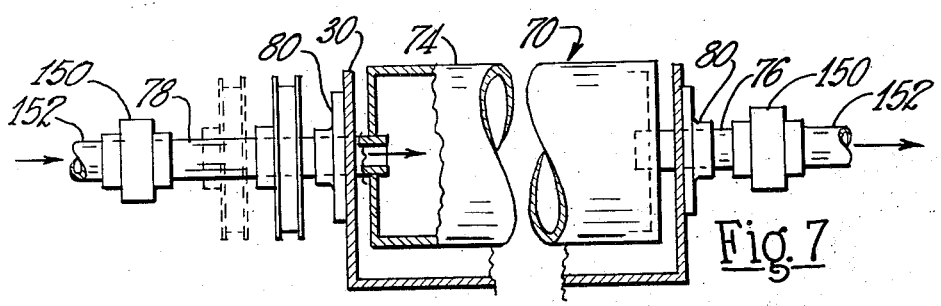
FIG. 7 is a front elevation view, partly in section of a cylindrical roll of the apparatus shown in FIG. 6.
Figure 8:
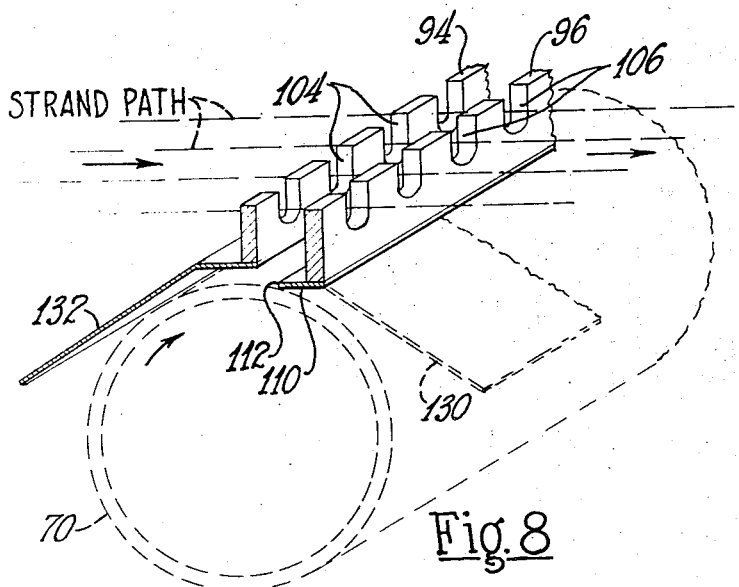
FIG. 8 is a view in perspective of a portion of the applicator shown in FIG. 6. The dashed lines indicate the cylindrical roll forming part of the applicator arrangement.

The applicators 34 and 36 includes apparatus for controlling the viscosity of the coating liquid 90. Referring to FIGS. 5, 6 and 7, a treating fluid of selected temperature, normally a cooling liquid such as water, from a suitable source is passed lengthwise through the hollow cylindrical roll 70. The treating fluid moves to and from the cylindrical roll 70 through the tubular shaft 76 and 78. Hence, commercial rotatable couplings 150 are used with supply tubes 152 to permit rotation of the roll 70.

The viscosity of the relatively thin layer of coating liquid 90 on the circumferential surface of the roller 70 is quickly affected by the temperature of the treating fluid in the roller 70.

Figure 11:
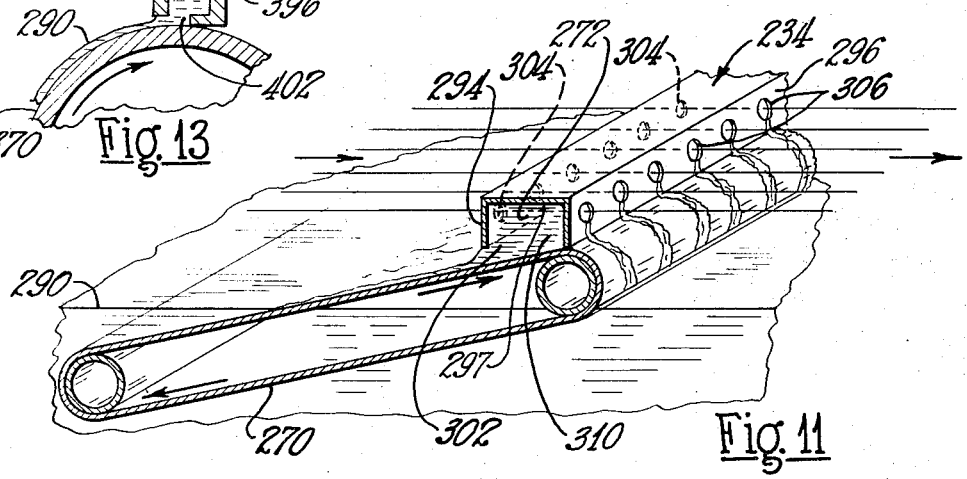
FIG. 11 is a view in perspective of another embodiment of liquid applying apparatus according to the principles of the invention.

FIG. 11 shows another applicator for applying coating liquid to linear elements like the strands 20 at the coating station 12. As shown the applicator, referred to by reference number 234, includes a driven movable continuous belt 270 supplying coating liquid 290 to an elongated confined space 372, which is disposed at right angles to the direction of belt movement. The belt 270 travels through coating liquid 290.

The sidewalls 294 and 296, together with a top wall 297, forms the elongated space 272 with an elongated inlet opening 302 at the bottom of the space 272. The sidewalls 294 and 296 have pairs of opposing circular openings 304 and 306 aligned for passage of linear elements like the strands 20 as the elements cross transversely of the space 272.

The base of wall 296 is in liquid removing relation with the belt 272. And like the stripper 110, the member 296 removes coating liquid from the moving belt 270.

Figure 12:
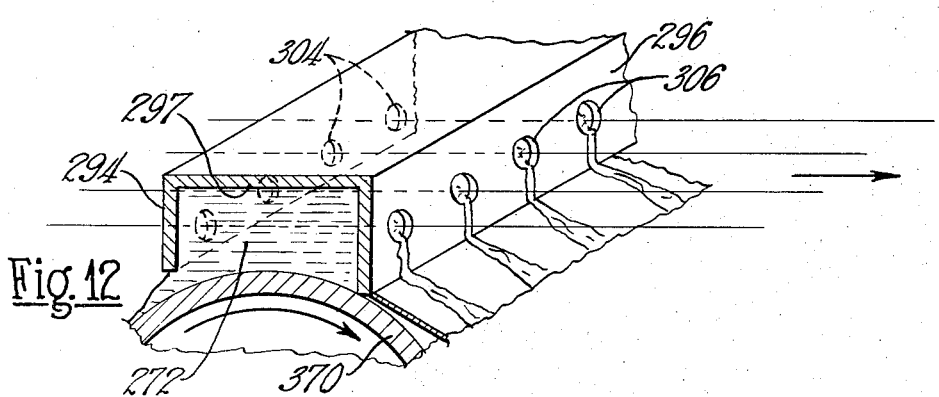
FIG. 12 is a view in perspective of yet another embodiment of apparatus for applying liquid to linear elements according to the principles of the invention.

The FIG. 12 shows a driven rotatable hollow cylinder 370 supplying a coating liquid 290 to the confined space 272 shown in FIG. 11.

Figure 13:
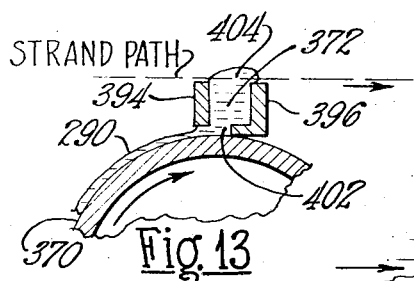
FIG. 13 is a side elevation view of still another embodiment of apparatus for applying liquid to linear material according to the principles of the invention.

FIG. 13 shows another applicator according to the principles of the invention. As illustrated there is a horizontally disposed longitudinal passageway 372 for containing liquid formed by walls including sidewalls 394 and 396. The bottom of the container has an elongated inlet 402 for supply of liquid to the space 372 formed by the sidewalls 394 and 396. The opening 402 extends the length of the container or passageway 372. There is an upper outlet 404 for discharge of liquid. The outlet 404 is elongated and extends the length of the container 372. The driven rotatable cylinder 370 advances liquid 290 to the container at a uniform rate along the entire length of the inlet 402. The rate of liquid supply is sufficient to provide a uniform supply of the liquid 290 above and along the entire length of the outlet 404. Linear elements can advance through the supply of liquid above the outlet 404 as the dashed line yarn path indicates in FIG. 13.

FIG. 14 illustrates an embodiment of apparatus for controlling the level of flowable material. The apparatus as shown includes means for sensing the level of the coating liquid 90 in the tank 30 and means effective in response to the sensed level for supplying coating liquid to the tank 30.

In a broad sense the level sensing apparatus includes means providing a passageway for flow of gas to a level to be sensed; means for supplying gas to the passageway and means for sensing flow of the supplied gas in the passageway as an indication of the level. The flow sensing means is effective to sense free flow of gas through the passageway when the outlet of the passageway is spaced from the level being sensed and to sense reduced gas flow therethrough when there is increased resistance to flow upon the level being in proximity with the outlet.

The control apparatus further includes means effective in response to the sensed free flow of gas in the passageway to supply coating liquid to the tank 30 and effective in response to the sensed reduced flow to stop the supply of coating liquid.

Referring to FIG. 14, the level sensing apparatus includes a member 400 forming a passageway 402 for flow of gas such as air, a blower 404 and a pivotally mounted flap 406.

The member 400 (passageway 402) includes a horizontal portion 408 and a downwardly disposed end portion 410 terminating with the outlet 412 of the passageway 402 at a selected height within the tank 30.

The blower 404 supplies gas, normally air, to the passageway 402 through the passageway entrance 414. Hence, the passageway 402 carries gas such as air to the level to be sensed, e.g., the surface of the coating liquid 90.

As shown the outlet 416 of the blower 404 is spaced adjacent the inlet or entrance 414 of the passageway 402 a distance identified as "d" in FIG. 14. Normally $d$ is less than an inch and usually about ¼ of an inch.

The blower 404 directs a supply of gas such as air into the passageway 402. In practice, the blower 404 supplies low pressure air.

The pivotally mounted flap 406 is in the horizontal portion of the passageway 402 and senses the flow or movement of air in the passageway. As shown a shaft 418 at the top of the passageway 402 pivotally holds the flap 406. As one can more clearly see in FIGS. 15 and 16, the major surfaces 420 and 422 of the flap 406 extend substantially across the entire transverse section of the passageway 402. In the embodiment shown the flap 406 includes an upper portion 424 outside the passageway 402; the upper portion 424 forms part of a switching arrangement for the level control apparatus.

Gas moved through the passageway 402 by the blower 404 moves the flap 406 about the shaft 418 as indicated in FIGS. 14 and 16.

The free flow of air through the passageway 402 during times the outlet 412 of the passageway 402 is spaced from the surface (level) of the coating liquid 90 displaces the flap 406 a greater amount than the reduced air flow during times the surface (level) is in proximity with the outlet 412. Hence, the flap 406 sensed the flow of air through the passageway as an indication of the level of the liquid coating 90 in the tank 30.

In practice, the blower 404 continuously directs air into the passageway 402. However, under certain conditions it may be advantageous to operate the blower 404 on a discontinuous basis.

In a preferred embodiment of the invention the blower 404 supplies air to the passageway 402 at a sufficiently low pressure that air does not escape from the passageway 402 through the outlet 412 during times the liquid 90 covers the outlet 412. Under such conditions air does not flow in the passageway 402; therefore, a low pressure static condition exists. Air from the blower 404 escapes into the atmosphere through the space *d* between the blower outlet 416 and the passageway inlet 414.

Such low pressure operation of the apparatus is especially useful to sense the level of liquid without entraining air in the liquid. In practice an air pressure of less than 1 pound per square inch above atmospheric has given good results when the liquid level being sensed is a body of vinyl plastisol.

The means for sensing air flow into the passageway 402 can take many forms. For example, the means for sensing air flow can be any member movable in response to gas flow in the passageway 402. Such a member in a more specific sense can be pivotally mounted as in the case of the flap 406. Further, the means sensing air flow might be a rotary device.

The apparatus for controlling the level of the coating liquid 90 further includes means effective in response to the sensed level to supply liquid to the tank 30. As shown in FIG. 14 this apparatus includes a switch 430 a solenoid actuated air control valve 432 and a pinch valve 434 including an air motor 436 having a piston rod 438 carrying a piston 440 at one end within the air motor 436 and a member 442 at the other end outside the air motor 436. The air motor 436 moves the member 442 towards and away from a portion 444 of a U shaped member 446.

Liquid held in a supply container 450 flows to the tank 30 through a flexible tube 452 during times the pinch valve 434 is open.

Movement of the flap 406 can actuate a switch or, as shown in FIG. 14, form part of a switch (switch 430) in a circuit supplying electrical power to the solenoid actuated air control valve 432. As shown suitable electrical power applied at $L_1$ and $L_2$ is supplied to the air control valve 432 through line 454 and lines 456 and 457. The switch 430 connects the lines 456 and 457.

The free flow of air through the passageway 402 (when the level of the liquid is spaced below the outlet 412) pivots the flap 406 to cause its upper portion 424 to make electrical contact between a contact 458 in line 457 and a contact 460 in the line 456 (close the switch 430). The upper portion 424 carries the contact 460.

The air control valve 432 is energized during times the switch 430 is closed.

The reduced flow of air through the passageway 402 pivots the flap 406 a sufficiently lesser amount than free air flow to prevent electrical contact between the contacts 458 and 460.

The valve 432 is de-energized during times the switch 430 is open.

One can adjust the switch 430 to open at a selected reduced flow of air or even, as it has been useful in practice, to have the switch 430 open when air flow in the passageway stops.

The solenoid actuated air control valve 432 controls the supply of air under pressure to the air motor 436. As shown air under pressure from a suitable source is supplied to the valve 432 through supply tubes 462 and 464.

Tubes 466 and 468 carry air from the valve 432 to the air motor 436. Air supplied to the motor 436 through the line 468 moves the rod 438 and member 442 towards the stationary portion 444. Air supplied through the line 466 moves the piston rod 438 and member 442 away from the stationary portion 444.

The flexible tubing 452 is between the member 442 and portion 444. During times the piston rod 438 is moved towards the portion 444, the member 442 and portion 444 squeeze the tube 452 closed as depicted in FIG. 17 to stop flow of liquid to the tank 30. During times the piston rod 438 is moved away from the portion 444, the tube 452 is open as depicted in FIG. 18 to allow liquid to flow to the tank 30.

Under certain conditions it is advantageous to use a time delay such as the time delay relay 470 shown in FIG. 19. Such an arrangement is especially useful in embodiments of the invention operating to permit flow of liquid to the tank 30 only during times air flows within the passageway 402. Roughness on the surface of the coating liquid 90 may cause interrupted air flow in the passageway 402 as the surface of the coated liquid 90 approaches the outlet 412 of the passageway to cause premature operation of the control apparatus. Hence, the time delay 470 can delay operation of the air control valve 432 for a specified time and thereby insure the level of the liquid 90 is actually at a selected level before the supply of liquid is stopped.

The level sensing and control apparatus is shown used with liquid. But the apparatus is useful with any flowable material, including bodies of discrete material such as sand.

We claim:

1. Apparatus for controlling the level of a body of flowable material comprising:

a member defining a passageway for flow of gas to the level of a body of flowable material;

a blower spaced from the inlet of the passageway for supplying air to the passageway at a pressure sufficiently low to prevent escape of air from the outlet of the passageway during times the outlet is covered by the flowable material;

means for directly sensing flow of gas in the passageway as an indication of the position of the level, such means including a flap, the member having an opening through its wall intermediate its ends for the flap, the sensing means further including means pivotally mounting the flap on the wall of the member in the opening with a portion of the flap being located outside of the member and a portion of the flap being located in the passageway with a major surface disposed across the passageway, such member being effective to sense the free flow of air thorugh the passageway when the outlet of the passageway is spaced from the level and to sense the reduced flow therethrough upon the level being such that the outlet of the passageway is covered with liquid; and supply means effective in response to the sensed free flow by the flap to supply flowable material to the body and effective in response to the sensed reduced flow by the flap to stop such supply, such supply means comprising an electrical supply control circuit including a control switch for energizing the circuit, the switch including two electrical contacts, one of the contacts being carried on the outside portion of the flap.

2. Apparatus for controlling the level of a body of liquid comprising:

a member defining a passageway for flow of gas to the level of a body of liquid;

a blower spaced from the inlet of the passageway for supplying air to the passageway at a pressure sufficiently low to prevent escape of air from the outlet of the passageway during times the outlet is covered by the liquid;

means for directly sensing flow of gas in the passageway as an indication of the position of the level, such means including a flap, the member having an opening through its wall intermediate the ends of the member for the flap, the sensing means further including means pivotally mounting the flap on the wall of the member in the opening with a portion of the flap being located outside of the member and a portion of the flap being located in the passageway with a major surface disposed across the passageway, such member being effective to sense the free flow of air through the passageway when the outlet of the passageway is spaced from the level and to sense the absence of flow therethrough upon the level being such that the outlet of the passageway is covered with liquid; and supply means effective in response to the sensed free flow by the flap to supply liquid to the body and effective in response to the sensed reduced flow by the flap to stop such supply, such supply means comprising an electrical supply control circuit including a control switch for energizing the control circuit, the switch including two electrical contacts, one of the contacts being carried on the outside portion of the flap, the supply means further including a flexible tube for carrying the liquid to the body and means responsive to the control circuit for squeezing the flexible tube to stop supply of the liquid to the body during times of reduced gas flow through the passageway and for releasing such squeezing to permit supply of the liquid to the body during times of free gas flow through the passageway.

* * * * *